United States Patent [19]

Kushiya

[11] Patent Number: 5,595,210
[45] Date of Patent: Jan. 21, 1997

[54] AUTO-DRAIN UNIT

[75] Inventor: Toru Kushiya, Yawara-mura, Japan

[73] Assignee: SMC Corporation, Tokyo, Japan

[21] Appl. No.: 450,785

[22] Filed: May 25, 1995

Related U.S. Application Data

[62] Division of Ser. No. 305,887, Sep. 14, 1994.

[30] Foreign Application Priority Data

| Sep. 30, 1993 | [JP] | Japan | 5-268079 |
| Jul. 13, 1994 | [JP] | Japan | 6-183870 |
| Jul. 13, 1994 | [JP] | Japan | 6-183871 |
| Jul. 13, 1994 | [JP] | Japan | 6-183872 |

[51] Int. Cl.⁶ ............................................. F16T 1/20
[52] U.S. Cl. ........................... 137/181; 137/195
[58] Field of Search ......................... 137/195, 422, 137/181, 244

[56] References Cited

U.S. PATENT DOCUMENTS

1,285,771  11/1918  Mertens et al. ................. 137/195
1,961,448  6/1934  Patterson ........................ 137/195

*Primary Examiner*—Gerald A. Michalsky
*Attorney, Agent, or Firm*—Oblon, Spivak, McClelland, Maier & Neustadt, P.C.

[57] ABSTRACT

In order to keep mechanisms related to opening and closing of a drain valve disc out of the influence of drain stored in a bowl, there are provided, at positions higher than a liquid level of the drain stored in the bowl, a pressure receiving member moving up and down due to pilot air pressure in a pilot chamber and for opening and closing the drain valve disc, a pilot valve seat for communicating the pilot chamber with the interior of the bowl, a pilot valve disc for opening and closing the pilot valve seat, an exhaust orifice for communicating the pilot valve chamber with the atmospheric air, and a lever tilted by upward or downward movement of a float and for opening and closing the pilot valve disc.

3 Claims, 8 Drawing Sheets

AUTO-DRAIN UNIT

This is a Division, of application Ser. No. 08/305,872 filed on Sep. 14, 1994.

FIELD OF THE INVENTION

The present invention relates to an auto-drain unit for automatically discharging drain by moving a float up and down.

DESCRIPTION OF THE BACKGROUND ART

Figure 12:
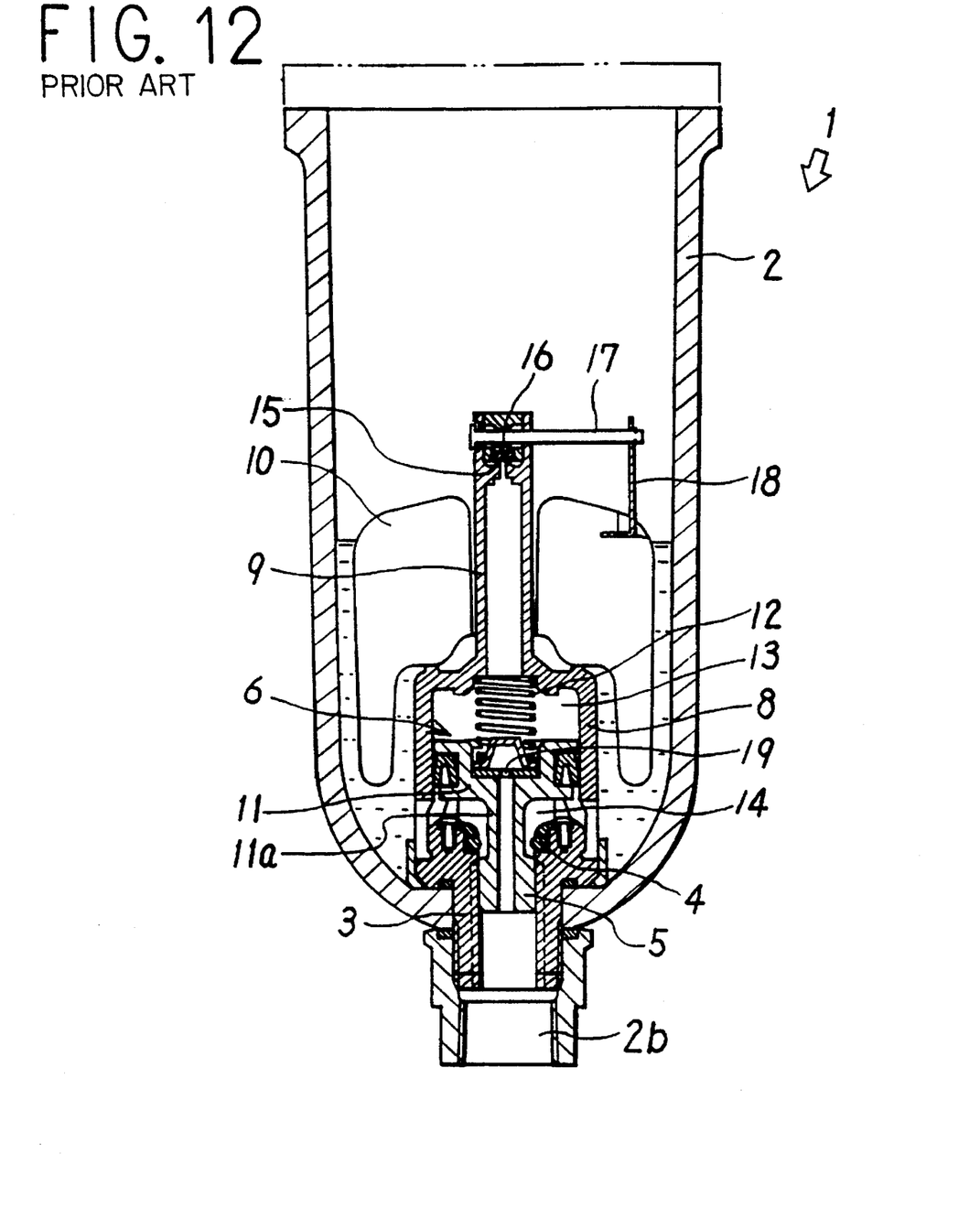
FIG. 12 is a longitudinal sectional view of a conventional type auto-drain unit.

FIG. 12 shows an example of a conventional type auto-drain unit, in which an auto-drain unit 1 comprises a bowl 2 for storing drain coming through a drain inlet (not shown), a cylindrical valve seat member 3 engaged in a drain outlet 2b at the inner bottom of the bowl 2, a drain valve seat 4 having a sealing member mounted on the valve seat member 3, a drain valve-disc 5 for opening and closing the drain valve seat 4, and a piston 6 integrally constructed with the drain valve disc 5.

Said piston 6 is accommodated in a cover 8 above the valve seat member 3 in such manner that the piston is moved up and down, and it is permanently pushed downward by a return spring 12, i.e. in a direction to open the drain valve seat 4 by the drain valve disc 5. On the cover 8, a guide tube 9 for guiding upward and downward movement of a float 10 is provided.

On the upper surface of the piston 6, a pilot chamber 13 is formed, and the pilot chamber 13 is communicated with the bowl 2 via a pilot valve seat 15 on the upper end of the guide tube 9 and is also permanently communicated with the drain outlet 2b via an orifice 19 having a diameter smaller than that of the pilot valve seat 15. On the lower surface of the piston 6, a pressure receiving chamber 14 directly communicated with the bowl 2 is provided.

A pilot valve disc 16 for opening and closing the pilot valve seat 15 is mounted on a rotating member 17, which is tilted by upward or downward movement of the float 10. When the float 10 is moved down, the pilot valve seat 15 is closed, and when the float 10 is moved up to a predetermined position, the pilot valve seat 15 is opened.

In the conventional type auto-drain unit 1 as described above, when liquid level of the drain in the bowl 2 is low, the float 10 is moved down and the pilot valve disc 16 closes the pilot valve seat 15. Thus, air pressure in the pilot chamber 13 opened to the atmospheric air via the orifice 19 is lower than the pressure in the pressure receiving chamber 14, which is communicated with the bowl 2. As a result, the piston 6 is moved to a position higher than the position in the figure against resilient force of the return spring 12, and the drain valve disc 5 closes the drain valve seat 4.

When liquid level of the drain is high and the float 10 is moved up to a predetermined height, the rotating member 17 is rotated counterclockwise, and the pilot valve disc 16 opens the pilot valve seat 15. Thus, pressurized air in the bowl 2 enters the pilot chamber 13. As a result, the sum of the operating force caused by air pressure, which is applied downward on the piston 6 in the pilot chamber 13, and the operating force caused by the return spring 12 becomes higher than the operating force applied upward on the piston 6 by drain in the pressure receiving chamber 14, and the piston 6 is moved down. Then, the drain valve disc 5 opens the drain valve seat 4 to discharge drain.

When the liquid level of the drain is decreased, the float 10 moves down, and the rotating member 17 is rotated clockwise, and the pilot valve disc 16 closes the pilot valve seat 15. Thus, the air in the pilot chamber 13 is gradually discharged to the outside through the smaller diameter orifice 19, and the air pressure decreases. Then, the piston 6 is moved up, and the drain valve disc 5 closes the drain valve seat 4, completing the discharge of the drain.

In the conventional type auto-drain unit 1, many members including the piston 6 are immersed in the drain, which is stored in the bowl 2. As a result, lubricant on the sealing member is washed off by drain, or foreign objects (such as solid matters, slurry, etc.) in the drain are caught. These adverse effects of the drain often cause erroneous operation and hinders maintenance operation to correct trouble or defective operation.

Because pilot air in the pilot chamber 13 is discharged through the drain outlet 2b together with the drain, the pilot air is not smoothly discharged in case a long and highly resistant pipe is connected to the drain outlet 2b, and erroneous operation may occur.

Further, manual operation from outside cannot be achieved, and it is also difficult to design such manual operation means.

SUMMARY OF THE INVENTION

It is an object of the present invention to provide an auto-drain unit, which ensures opening and closing operation of the valve disc by keeping the members relating to opening and closing of the valve disc out of the influence of the drain stored in the bowl.

It is another object of the present invention to provide an auto-drain unit, in which component members can be easily disassembled and which facilitates maintenance and repair.

It is still another object of the present invention to provide an auto-drain unit, in which pilot air can be smoothly discharged, exhaust orifice is not clogged, and operation is performed in stable manner.

It is still another object of the present invention to provide an auto-drain unit, which can be easily operated manually from outside.

To attain the above objects, the auto-drain unit of the present invention comprises a bowl of cylindrical shape for storing drain and provided with a drain inlet in the above and a drain outlet on the bottom, a drain valve seat for discharging drain and mounted on the drain outlet, a drain valve disc for opening and closing the drain valve seat, a pressure receiving member for opening and closing the drain valve disc by moving up and down as pilot air is supplied to or discharged from the pilot chamber, a pilot valve seat for communicating the pilot chamber with the interior of the bowl, a pilot valve disc for opening and closing the pilot valve seat, an exhaust orifice having an effective opening area smaller than the pilot valve seat and communicating the pilot chamber to atmospheric air, a float moving up and down according to liquid level of the drain in the bowl, and a lever tilted by upward or downward movement of the float and for opening and closing the pilot valve disc, whereby said pressure receiving member, pilot valve seat, pilot valve disc, exhaust orifice and lever are provided at positions higher than liquid level of the drain stored inside the bowl.

According to a preferred aspect of the present invention, the bowl is provided with a cover, which can be freely opened or closed. On the cover, the pressure receiving member, pilot valve seat, exhaust orifice and lever are mounted, and the lever is supported by the cover at an intermediate point so that it can be tilted. On one side of the supporting point, the float is connected, and the pilot valve body is mounted on the other side of the supporting point.

In the present invention, the pressure receiving member is provided with a needle valve for opening and closing the exhaust orifice and has a pin, which is inserted into the exhaust orifice with a gap, and it is preferable that the pin is moved in the exhaust orifice by opening and closing of the needle valve, thus preventing clogging of the orifice.

The cover may be provided with a manual operation means, by which it is possible to open the pilot valve disc by manual operation.

Also, the auto-drain unit of the present invention comprises a bowl inlet in the above and a drain outlet at the bottom, an inner tube removably accommodated in said bowl, having an opening communicated with said bowl on side wall and provided with a drain valve seat for discharging drain at a position corresponding to the drain outlet of the bowl, a drain valve disc for opening and closing the drain valve seat of said inner tube, a pressure receiving member for opening and closing the drain valve disc by moving up and down as pilot air is supplied to and discharged from the pilot chamber, a pilot valve seat for communicating the pilot chamber with the interior of the bowl, a pilot valve disc for opening and closing the pilot valve seat, an exhaust orifice having an effective opening area smaller than the pilot valve seat and communicating the pilot chamber to atmospheric air, a float moving up and down according to liquid level of the drain in said inner tube, and a lever tilted by upward or downward movement of the float and opening and closing the pilot valve disc, whereby the pressure receiving member, pilot valve seat, pilot valve disc, exhaust orifice and lever are provided at positions higher than liquid level of the drain in the bowl.

According to an embodiment of the present invention, the bowl has a cover, which can be freely opened or closed. On the cover, inner tube, pressure receiving member, pilot valve seat, exhaust orifice, and lever are mounted. The lever is tiltably supported by the cover at an intermediate point so that it can be tilted freely. The float is connected to one side of the supporting point and the pilot valve disc is mounted on the other side of the supporting point. By opening the cover, all mechanisms and members relating to drain discharge in the bowl can be taken out of the bowl.

In the present invention, the pressure receiving member has a needle valve for opening and closing the exhaust orifice and is also provided with a pin, which is inserted into the exhaust orifice with a gap. By opening and closing the needle valve, the pin is moved in the exhaust orifice to prevent clogging.

The cover may be provided with a manual operation means, by which it is possible to open the pilot valve disc by manual operation.

In the present invention, when pressure is applied in the bowl and liquid level of the drain is low, the float moves down and the pilot valve disc closes the pilot valve seat. Thus, the pilot chamber is shut off from the interior of the bowl, and air pressure in the pilot chamber is low. As a result, pressure receiving chamber moves up, and the drain valve disc closes the drain valve seat.

When liquid level of the drain is high and the float is moved up to a predetermined height, the lever is tilted, and the pilot valve disc opens the pilot valve seat. Then, pressurized air in the bowl flows into the pilot chamber, and the pressure receiving member is moved down, and the drain valve disc opens the drain valve seat. As a result, the drain in the bowl is discharged through the drain outlet.

When the float is moved down as the drain is discharged, the lever is tilted and the pilot valve disc closes the pilot valve seat. Then, the air in the pilot chamber gradually flows out through the small diameter exhaust orifice. Then, the pressure receiving member is moved up, and the drain valve disc closes the drain valve seat, and drain discharge is completed.

In the present invention, pressure receiving member, pilot valve seat, pilot valve disc, exhaust orifice and lever are provided at positions higher than liquid level of the drain inside the bowl. Accordingly, erroneous operation or trouble caused by immersion of these members in the drain can be prevented, and reliable opening and closing operation of the valve disc is ensured.

DETAILED DESCRIPTION OF THE PREFERRED EMBODIMENTS

FIG. 1 to FIG. 7 each represents a first embodiment of the present invention. As it is evident from FIG. 1, the auto-drain unit 21 comprises a bowl 22 in cylindrical shape for storing drain, an inner tube 23 removably placed into the bowl 22, a cover 25 air-tightly mounted on an upper end of an opening of the bowl 22, and a valve disc drive unit 26 for opening and closing a drain valve disc 45. The inner tube 23 is mounted on the cover 25 by an appropriate means (not shown) via an adapter plate 24, which constitutes a part of the cover 25.

Figure 1:
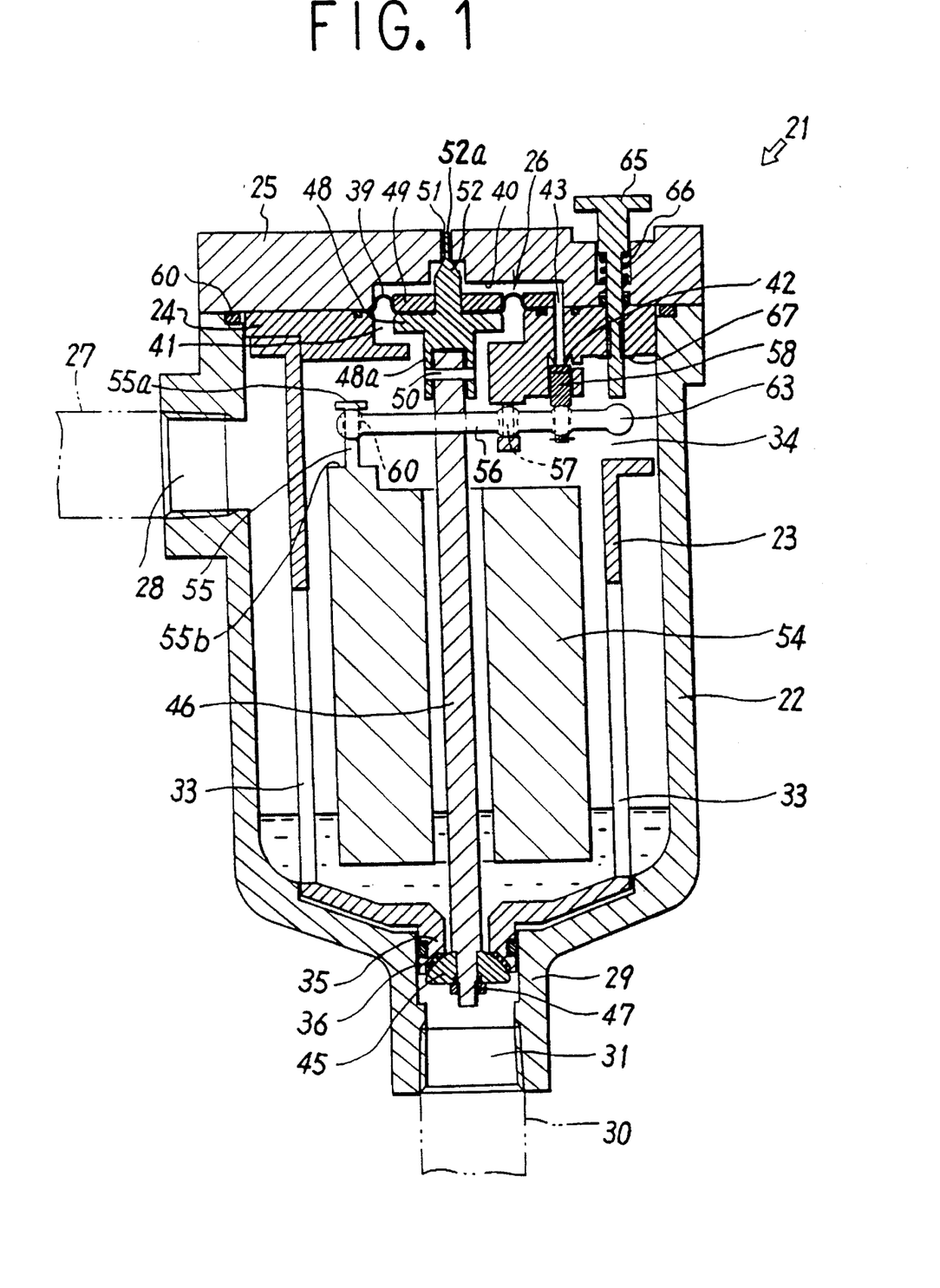
FIG. 1 is a longitudinal sectional view of a first embodiment of an auto-drain unit of the present invention.

The bowl 22 is provided with a drain inlet 28 for connecting a drain supply pipe 27 to an upper portion of a side wall and with a cylinder unit 20 having a drain outlet 31 at its bottom. A drain discharge pipe 30 is connected to the drain outlet 31.

The inner tube 23 is provided with a plurality of openings 33, which communicate the inner tube 23 with the bowl 22 on the lower portion of the side wall and with a cutout portion 34 on the upper portion of the side wall to form a space where the lever 56 can move around. It is further provided with a drain discharge unit 35 of cylindrical shape at the bottom air-tightly engaged with the cylindrical portion 29 of the bowl 22. On the lower surface of the drain discharge unit 35, a drain valve seat 36 for discharging the drain in the bowl 22 is arranged.

Circumferential edge of a diaphragm 39 serving as a pressure receiving member is air-tightly squeezed between the adapter plate 24 and the cover 25. On upper and lower surfaces of the diaphragm 39, a pilot chamber 40 and a pressure receiving chamber 41 are defined. The pilot chamber 40 is communicated with the inner tube 23 via a pilot passage 43 and a pilot valve seat 42, and the pressure receiving chamber 41 is communicated directly with the inner tube 23.

The drain valve disc 45 for opening and closing the drain valve seat 36 from below is mounted by nuts 47 on the lower end of a rod, which is arranged vertically at the center of the inner tube 23.

Central portion of the diaphragm 39 is squeezed from above and below by a diaphragm holder 48 and a shell 49 from above and below. Upper end of the rod 46 is movably mounted by a pin 50 on a forked member 48a disposed on the lower end of the diaphragm holder 48. The reason why the diaphragm holder 48 and the rod 46 are movably connected by the pin 50 is to absorb deviation of central position and angular deviation of the diaphragm 39 and the drain valve seat 36 and to increase sealing performance by the drain valve disc 45. However, in case the above deviation can be eliminated by precision fabrication and assembling, the diaphragm holder 48 and the rod 46 may be integrally designed or they may be directly connected by screw.

On the cover 25, an exhaust orifice 51 for communicating the pilot chamber 40 with the atmospheric air is provided, and effective opening area of the exhaust orifice 51 is designed smaller than effective opening area of the pilot valve seat 42 for communicating the pilot chamber 40 to the interior of the bowl 22. On the upper surface of the diaphragm holder 48, a needle valve 52 for opening and closing the exhaust orifice 51 is disposed, and a pin 52a is provided on the needle valve 52 in a such a manner that an effective opening area for passing the air into the exhaust orifice 51 is maintained. The pin 52a moves up and down in the exhaust orifice 51 as the needle valve 52 is opened or closed by upward or downward movement of the diaphragm 39 in order to prevent clogging of the exhaust orifice 51.

In the inner tube 23, a float 54 surrounding the rod 46 is provided in such a manner that it can be moved up and down, and a rod-like connecting member 55 facing upward is arranged on the upper surface of the float 54. The connecting member 55 is movably placed into a connecting hole 60, which penetrates through one end of the lever 56 in a vertical direction. On the upper end and lower end of the connecting member 55, pressure members 55a and 55b are arranged at a given distance so that these members are engaged with the lever 56 to rotate it up and down.

Figure 2:
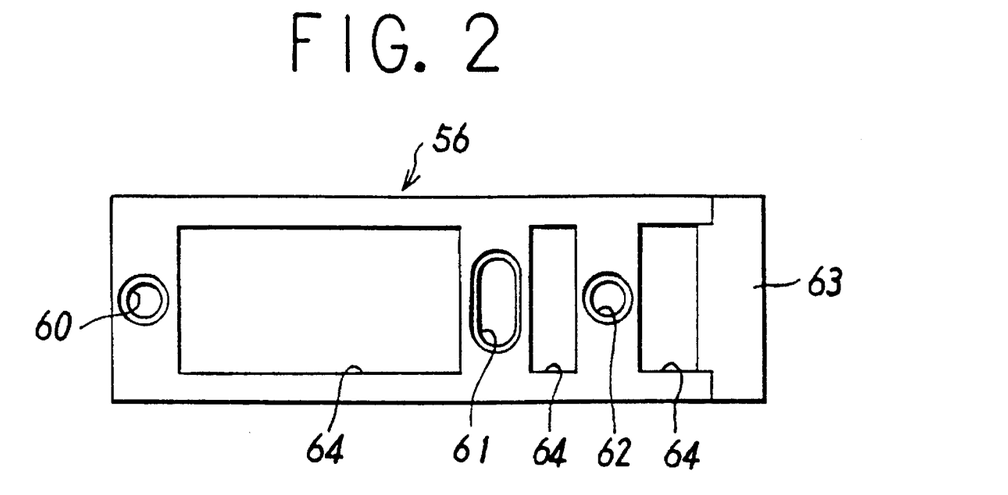
FIG. 2 is a plan view of a lever.
Figure 3:
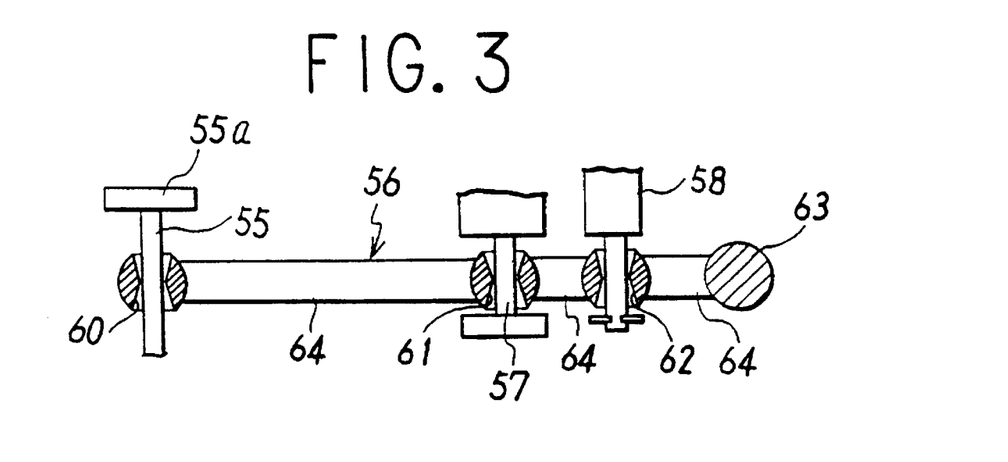
FIG. 3 is a schematical cross-sectional view of the embodiment of FIG. 1 when the lever is mounted.
Figure 4A:
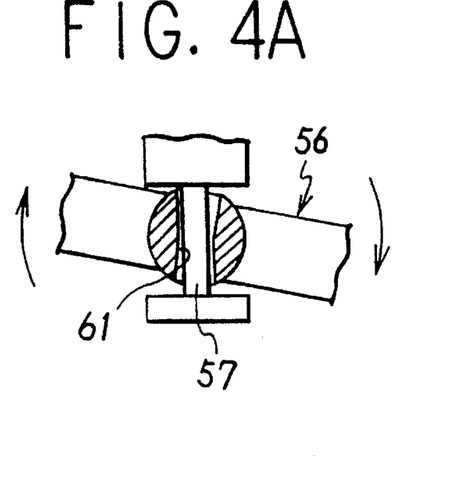
FIGS. 4A and 4B represent cross-sectional views each showing an essential portion to explain operating conditions of the lever.
Figure 4B:
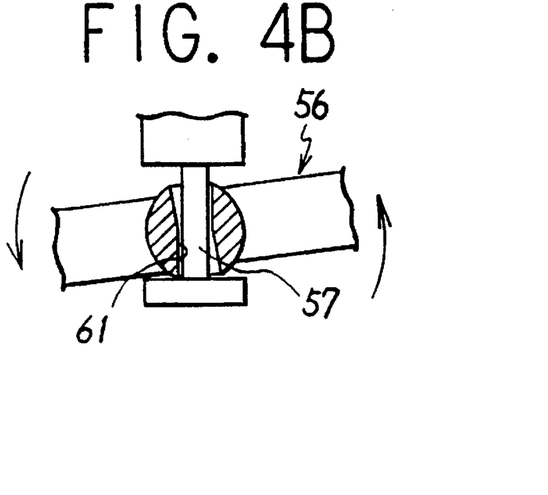

As it is evident from FIG. 2 and FIGS. 4A, 4B, the lever 56 is designed in the shape of an elongated ladder. At the position of a rocking lever hole 61, elongated in lateral direction and arranged at intermediate portion, the lever is tiltably supported by a rocking lever shaft 57, which protrudes beyond lower surface of the adapter plate 24 and has a large width. On one end of the lever 56, the connecting hole 60 is provided, and the connecting member 55 of the float 54 is inserted in the connecting hole 60. On the side of the rocking lever shaft 57 opposite to the connecting member 55, a mounting hole 62 is formed at a position relatively closer to the rocking lever shaft 57, and a pilot valve disc 58 for opening and closing the pilot valve seat 42 is mounted in the mounting hole 62. Further, an abutment member 63, movable by pressing a manual operation button 65, is provided on an end of the lever 56.

Each of the holes 60, 61 and 62 has a smaller diameter at an intermediate portion in the axial direction, and the diameter is gradually increased in both directions. Moreover, these holes 60, 61 and 62 as well as the shafts placed into them have surplus allowances in the axial direction. By cumulative effect, the lever 56 can be tilted at a desired angle even when shafts penetrate through the holes 60, 61 and 62 as shown in FIG. 4.

At a position on the lever 56, avoiding the holes 60, 61 and 62 as well as the abutment member 63, the rod 46 is placed in such manner that it may not interfere with the lever 56, and a plurality of penetrating spaces 64 are provided so that the rod 46 can be inserted without interfering with the lever 56, and drain and air can be passed without hindrance.

The abutment member 63 provided on the end of the lever 56 also serves as a weight. By the weight of the abutment member 63 and the pilot valve disc 58, the weight of the portion of the lever 56 from the position of the rocking lever shaft 57 to the abutment member 63 is heavier than the weight of the opposite portion.

Thus, the valve disc drive unit 26 comprises a pilot chamber 40 and a pressure receiving chamber 41 defined by the diaphragm 39, a pilot valve seat 42, a rod 46, an exhaust orifice 51 and a lever 56 having a pilot valve disc 58.

The manual operation button 65, penetrating through the cover 25 and the adapter plate 24, is pushed by a spring 66 in a direction to jump out from the cover 25, and it is prevented from falling off by a retaining ring 67 engaged near the forward end. The forward end of the manual operation button 65 is arranged face-to-face to the abutment member 63 of the lever 56 with a given gap. By pressing the manual operation button 65 to rotate the lever 56, the pilot valve disc 58 can be manually opened.

In the auto-drain unit 21 with the above arrangement, in case pressure is applied in the bowl 22 and liquid level of the drain is low as shown in FIG. 1, the float 54 is moved down, and the pilot valve disc 58 closes the pilot valve seat 42 by the difference of air pressure between the pressure receiving chamber 41 under high pressure and the pilot chamber 40 under low pressure. Accordingly, the diaphragm 39 is at elevated position and the rod 46 is also moved up, and the drain valve disc 45 closes the drain valve seat 36. Also, the exhaust orifice 51 is closed by the needle valve 52.

When liquid level of the drain in the bowl 22 moves up and the float 54 is moved up to a predetermined height, the pressure member 55b is brought into contact with the lower surface of the connecting hole 60 of the lever 56. As the float 54 is moved up further, the pressure member 55b pushes up the end of the lever 56. As a result, the lever 56 is rotated clockwise in the figure. The pilot valve disc 58 opens the pilot valve seat 42, and pressurized air in the bowl 22 moves into the pilot chamber 40.

When the pressurized air enters and air pressure in the pilot chamber 40 increases and is equalized with air pressure in the pressure receiving chamber 41, operating force of fluid pressure applied downward on the diaphragm 39 and the drain valve disc 45 becomes higher than operating force applied upward. Then, the diaphragm 39, the rod 46 and the drain valve disc 45 move down, and the drain valve seat 36 is opened, discharging the drain stored in the bowl 22. In this case, the needle valve 52 opens the exhaust orifice 51 and the pilot chamber 40 is communicated with the atmospheric air. Because the effective opening area of the exhaust orifice 51 is smaller than the effective opening area of the pilot valve seat 42, air pressure in the pilot chamber 40 is not lowered unnecessarily.

Figure 5:
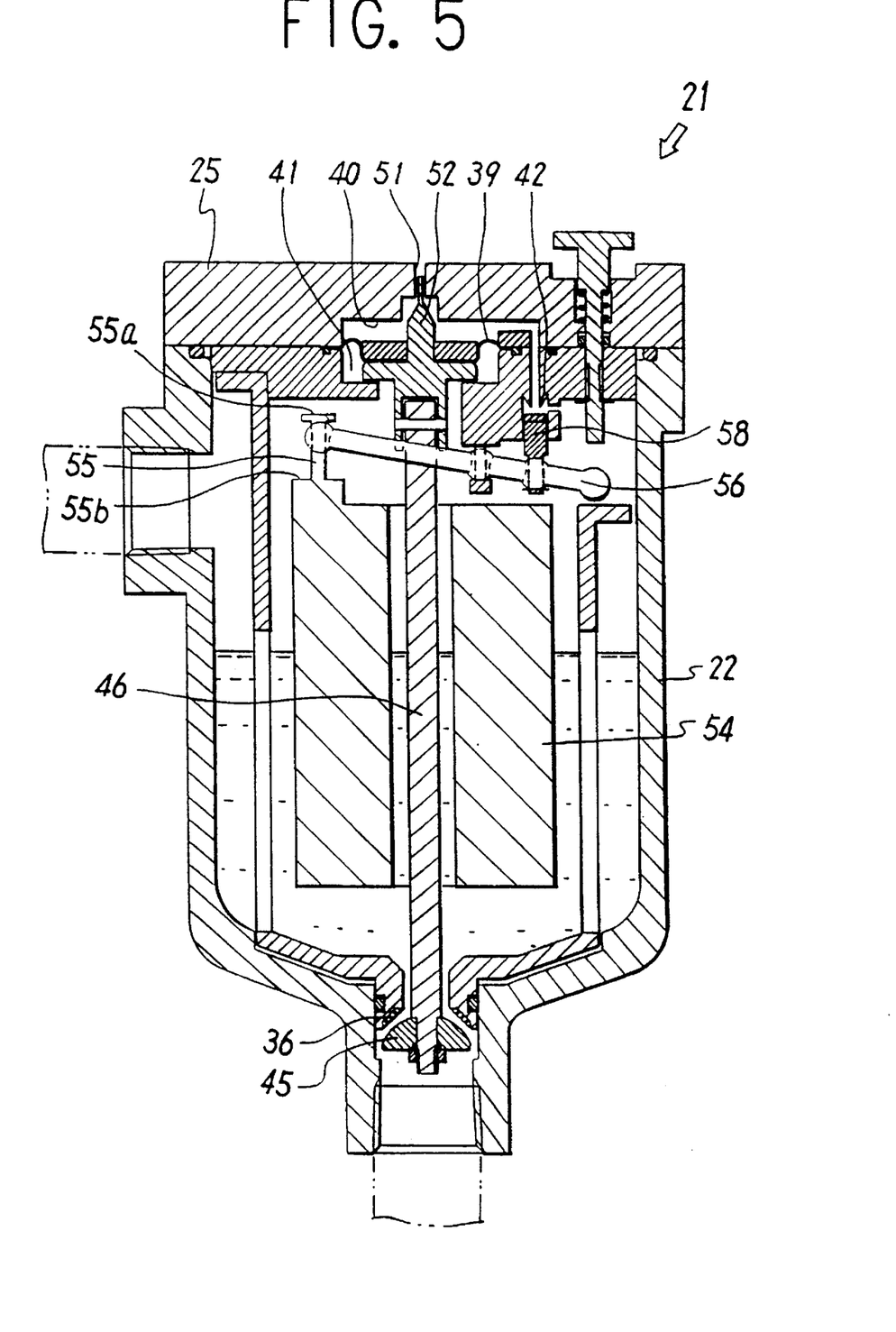
FIG. 5 is a longitudinal sectional view showing a different operating condition of the auto-drain unit of the first embodiment.

Because the portion of the lever 56 closer to the pilot valve disc 58 is heavier, it is tilted as shown in FIG. 5, and this state is maintained until discharge of the drain is completed and it is returned by action of the float 54. During this period, the pilot valve disc 58 maintains the pilot valve seat 42 in open condition.

When the drain is discharged and liquid level is lowered, the float 54 moves down and the lever 56 is pulled down. Thus, it is returned to the state of FIG. 1, and the pilot valve disc 58 closes the pilot valve seat 42. As a result, the air in the pilot chamber 40 is gradually discharged through the exhaust orifice to outside, and air pressure in the pilot chamber 40 decreases. Then, the diaphragm 39 and the rod 46 move up, and the drain valve disc 45 closes the drain valve seat 36, and the needle valve 52 closes the exhaust orifice 51.

When the needle valve 52 opens or closes, the pin 52a moves in the exhaust orifice 51 and cleans up the interior of the orifice, thus preventing clogging due to foreign objects.

Figure 6:
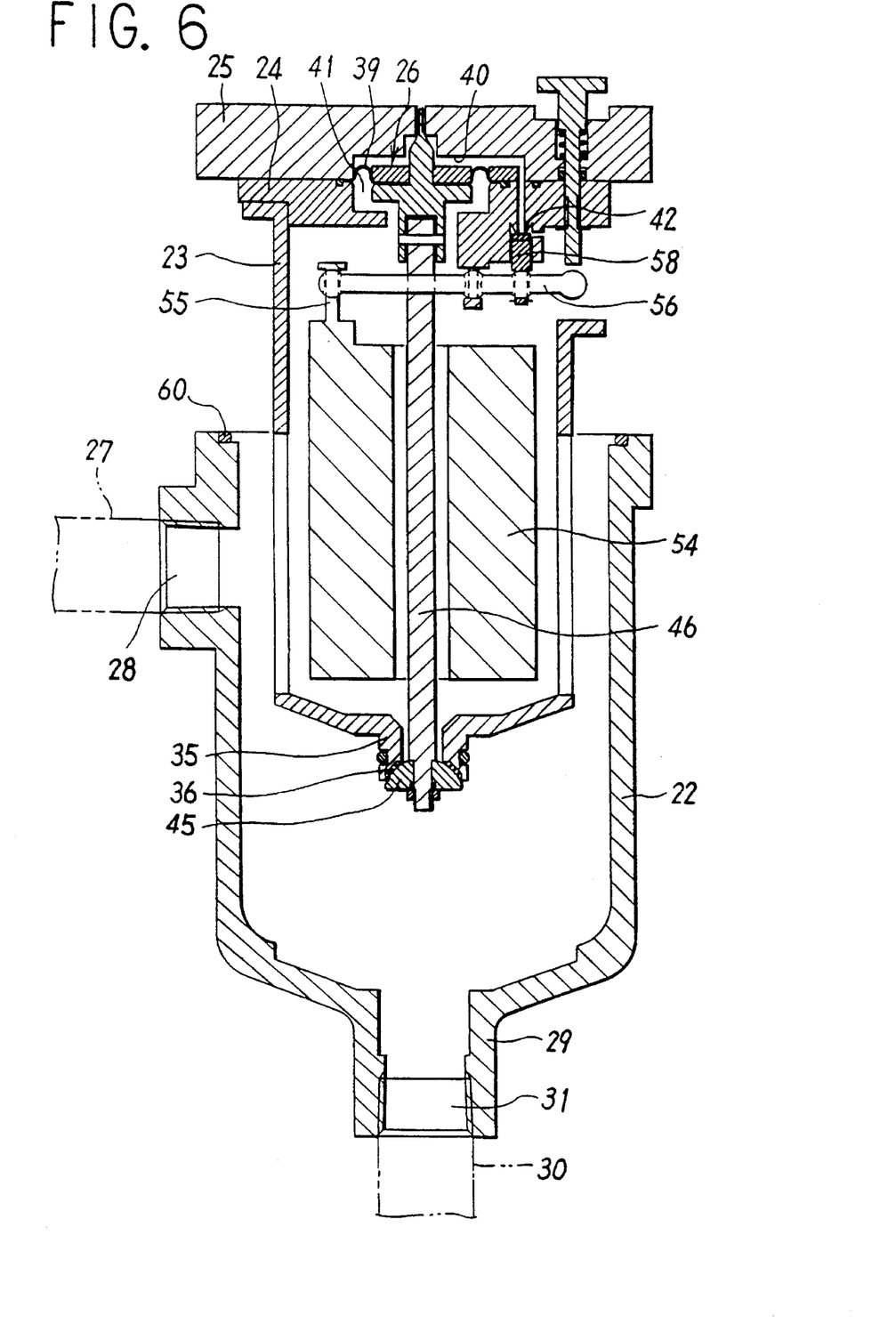
FIG. 6 is a longitudinal sectional view showing the auto-drain unit of the first embodiment when it is disassembled.

To perform maintenance for the auto-drain unit 21, the cover 25 is opened as a shown in FIG. 6. Then, all members and mechanisms relating to drain discharge and accommodated in the bowl including the inner tube can be removed upward from the bowl 22.

Figure 7:
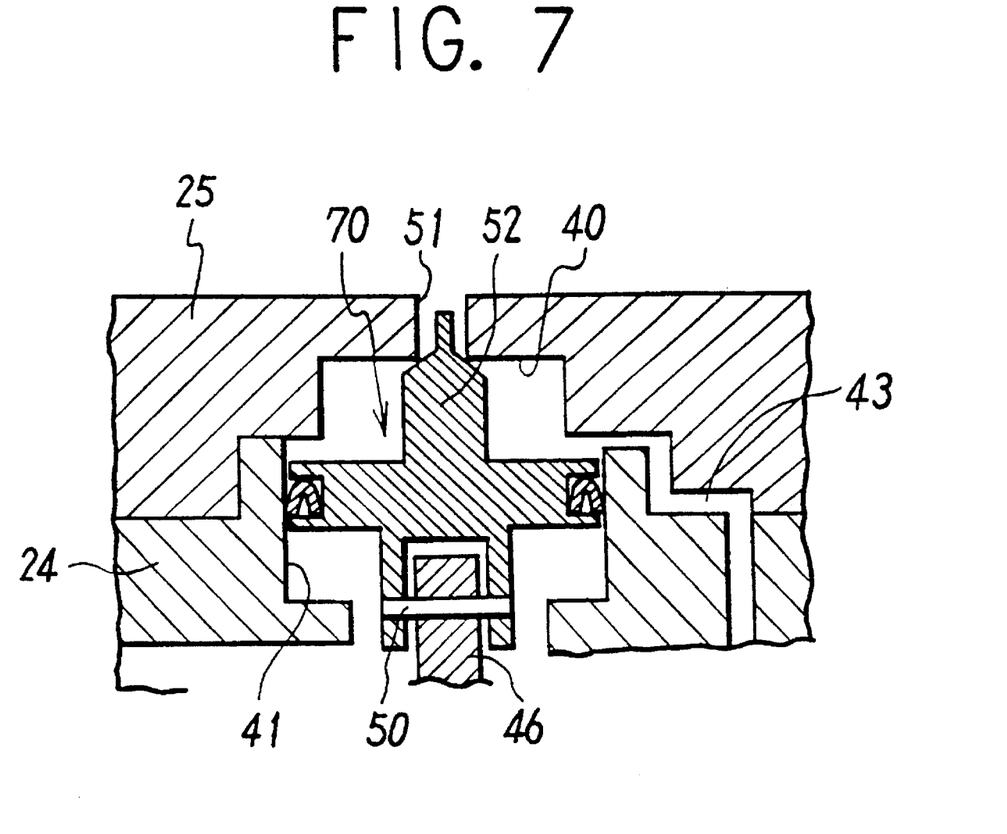
FIG. 7 is a partial cross-sectional view showing a variation of a pressure receiving member.

In the above embodiment, the diaphragm 39 serves as the pressure receiving member for opening and closing the pilot valve disc 58, while a piston 70 may be used as the pressure receiving member as shown in FIG. 7. The arrangement of the embodiment of FIG. 7 is the same as the above embodiment in other aspects.

Figure 8:
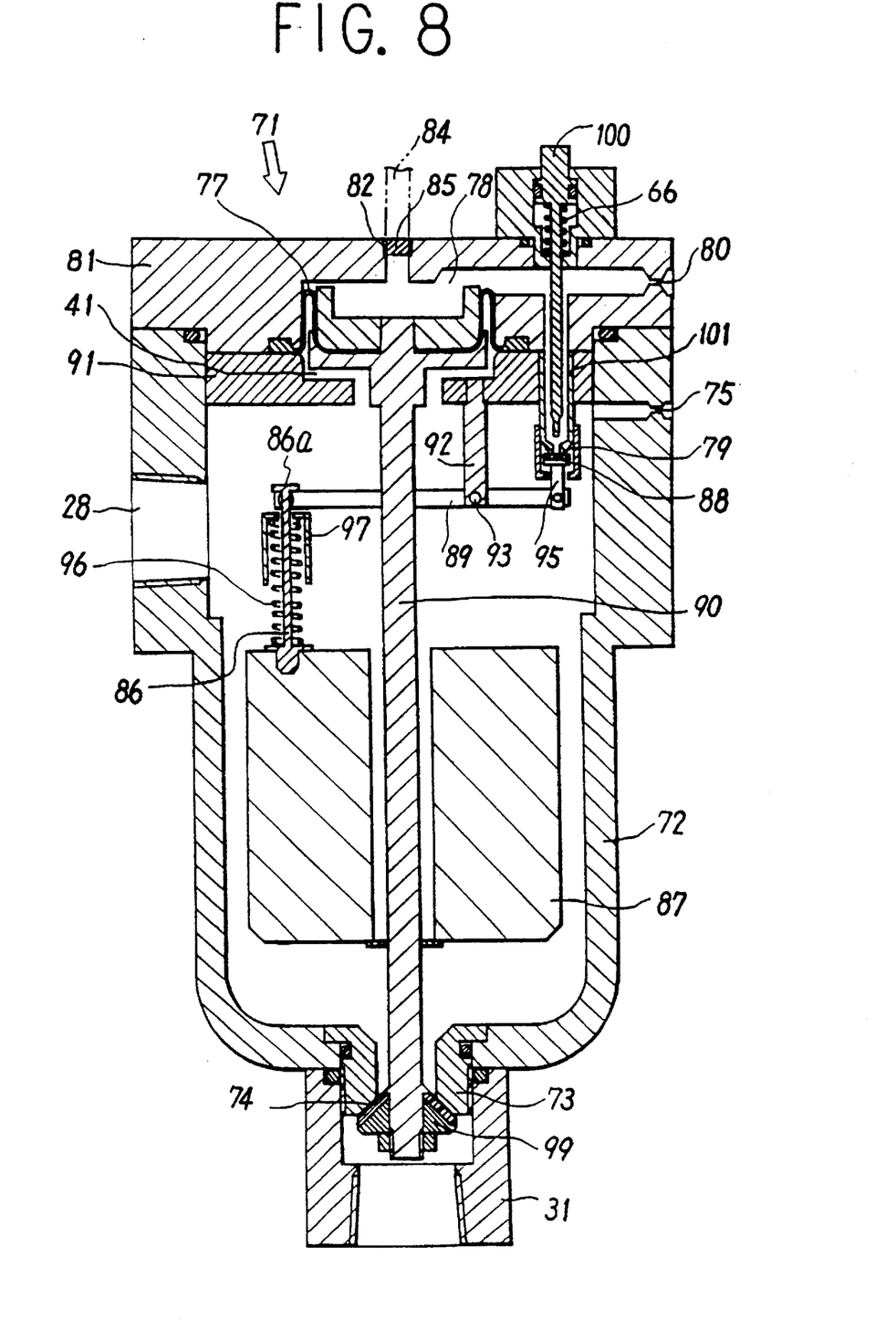
FIG. 8 is a longitudinal sectional view of a second embodiment of the auto-drain unit of the present invention.

FIG. 8 to FIG. 11 each represents a second embodiment of the present invention, in which an auto-drain unit 71 is substantially the same as the above first embodiment except for the following points:

First, in the auto-drain unit 71, the inner tube 23 having the drain valve seat 36 is not provided in the bowl 22 as in the first embodiment, but a drain valve seat 74 is directly disposed at a drain outlet 73 of a bowl 72.

Also, an air outlet 75 to facilitate inflow of the drain is arranged on the side wall of the bowl 72. However, this air outlet 75 may not be provided.

A pilot chamber 78 on the upper surface of a pressure receiving member 77 is permanently communicated with the atmospheric air on the side of a cover 81 through an exhaust orifice 80 having a smaller diameter than that of the pilot valve seat 79. An opening 82 communicated with the pilot chamber 78 is provided on the upper surface of the cover 81 so that a pressure sensor for detecting pilot pressure can be mounted. Also, a pilot tube 84 may be connected to this opening 82, and pilot air may be used as a signal to drive other devices and units. If neither the pressure sensor nor the pilot tube 84 is connected to the opening 82, the opening 82 is closed using a plug 85.

Figure 9:
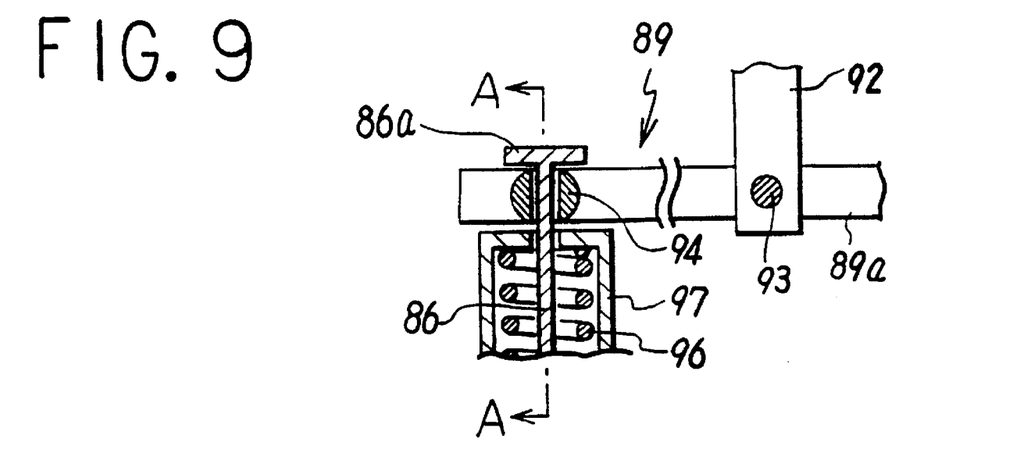
FIG. 9 is a partial enlarged cross-sectional view of the second embodiment.
Figure 10:
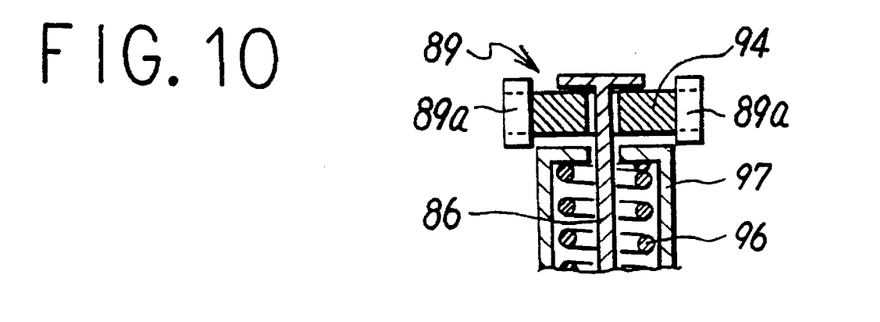
FIG. 10 is a cross-sectional view along the line A—A of FIG. 9.
Figure 11:
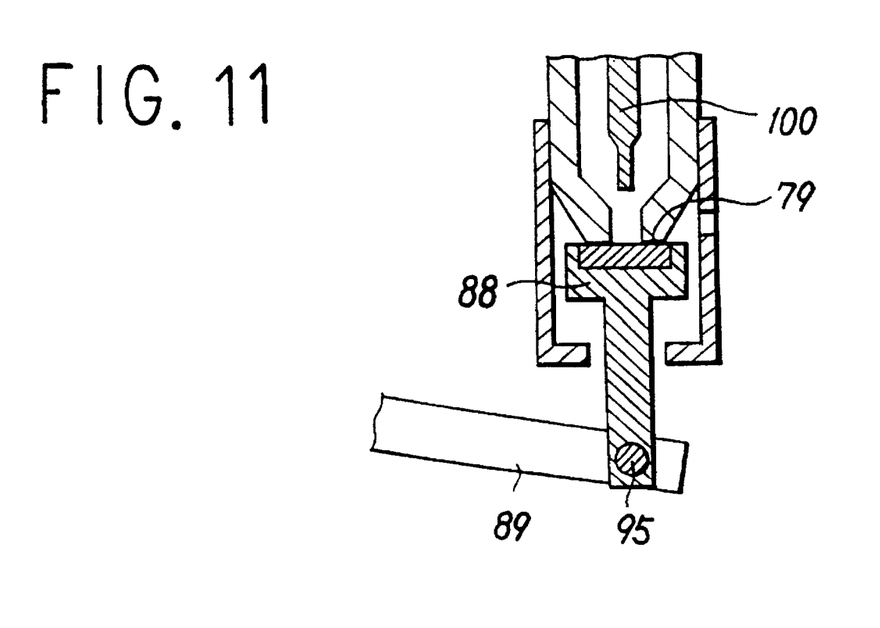
FIG. 11 is a partial enlarged cross-sectional view of the second embodiment.

As it is evident from FIG. 9 to FIG. 11, the lever 89 opens and closes the pilot valve disc 88 by tilting when the float 87 moves up and down, and it comprises a pair of bars 89a and 89a, which are provided in parallel to each other with a rod 90 between them. These bars 89a and 89a are rotatably supported at an intermediate position by a pin 93 on a support member 92, which is extended downward from an adapter plate 91. At the position of each of the bars 89a and 89a closer to one end, a slide pin 94 is rotatably mounted. On the position of each of the bars 89a and 89a closer to the other end, a pilot valve disc 88 is rotatably mounted by a pin 95.

On a connecting member 86 connecting the lever 89 with the float 87, an operating member 97, also serving as a spring cover and designed in inverted cup shape, is mounted in such manner that it can be moved up and down, and a coil spring 96 is arranged between the operating member 97 and the float 87. Resilient force of the coil spring 96 is of such magnitude that the pilot valve disc 88 may not be opened even when the coil spring 96 is compressed.

Therefore, when liquid level of the drain is moved up from the state shown in FIG. 8 and the float 87 gradually moves up, thereby compressing the coil spring 96, and after contacting the lower end of the operating member 97, the lever 89 is pushed up by further upward movement. The lever 89 is tilted, and the pilot valve disc 88 opens the pilot valve seat 79. As a result, pressure in the pilot chamber 78 increases and the pressure receiving member 77 moves down, and the drain valve disc 99 is opened. When the pilot valve seat 79 is opened and there is almost no differential pressure applied on the pilot valve disc 88 in the valve-opening direction, the lever 89 is pushed up by resilient force of the compressed coil spring 96 and is extensively tilted.

When drain discharge is completed, the float 87 moves down, and an engaging member 86a on the upper end of the connecting member 86 pulls the lever 89 down. Then, the lever 89 is returned to the state of FIG. 8 and the pilot valve disc 88 closes the pilot valve seat 79. When pressure in the pilot chamber 78 is reduced, the pressure receiving member 77 is moved up, and the drain valve disc 99 closes the drain valve seat 74.

Thus, when the lever 89 returns after the drain has been completely discharged, tilting angle of the lever 89 is wide, and the time until the pilot valve seat 79 is closed by the pilot valve disc 88 is considerably long. For this reason, the time to close the drain valve seat 74 by the drain valve disc 99 is also long, and the quantity of drain discharge increases each time the drain valve seat 74 is opened. Because there is some surplus allowance between the float 87 and the operating member 97, frequent drain discharge, which may be caused by slight upward or downward movement of the float 87 due to vibration of the bowl 22, can be prevented.

Further, a manual operating member 100 on the cover 81 is provided in a pilot passage 101. By pressing this down, the pilot valve disc 88 can be directly pushed and opened.

In the second embodiment, the same component as in the first embodiment is referred by the same symbol, and detailed description is not given here.

Also, it is needless to say that the inner tube may be provided in the bowl 72 in the second embodiment in a manner similar to the first embodiment.

As described above, in the auto-drain unit of the present invention, it is possible to ensure reliable opening and closing operation for the drain valve disc because the components and the mechanisms related to opening and closing operation of the drain valve disc can be kept out of the influence of the drain stored in the bowl.

Also, it is easy to disassemble the components and to facilitate maintenance and repair.

Further, the air in the pilot chamber is discharged through the portion not related to the drain outlet, and this makes it possible to ensure smooth discharge of the drain and to prevent erroneous operation even when a highly resistant pipe is connected to the drain outlet, and no clogging of the exhaust orifice occurs. Thus, stable operation is assured, and the system can be manually operated from outside.

Moreover, operation of the lever for opening and closing the pilot valve disc is performed stably, and opening time of the drain valve disc can be elongated. This makes it possible to increase the quantity of drain discharge per operation and to prevent erroneous operation, which may be caused by slight upward or downward movement of the float.

What we claim are:

1. An auto-drain unit comprising: a bowl of cylindrical shape for storing liquid and provided with a drain inlet at an upper portion and a drain outlet at a bottom portion, a drain valve seat for discharging drain and mounted on the drain outlets, a drain valve disc for opening and closing the drain valve seat, a pressure receiving member for opening and closing the drain valve disc by moving up and down as pilot air is supplied to or discharged from a pilot chamber, a pilot valve seat for communicating the pilot chamber with an interior of the bowl, a pilot valve disc for opening and closing the pilot valve seat, an exhaust orifice having an effective opening area smaller than the pilot valve seat and communicating the pilot chamber to atmospheric air, a float moving up and down according to a liquid level of liquid in the bowl, and a lever tilted by upward or downward movement of the float and for opening and closing the pilot valve disc, wherein:

said pressure receiving member, said pilot valve seat, said pilot valve disc, said exhaust orifice and said lever are provided at positions higher than the liquid level of the liquid stored in the bowl;

said bowl is provided with a cover, which can be freely opened, said pressure receiving member, said pilot valve seat, said exhaust orifice and said lever are mounted on said cover, said lever is tiltably supported by said cover at an intermediate point, said float is connected to one side of the supporting point, and said pilot valve disc is mounted on the other side of the intermediate point; and an operating member is provided for applying a pushing force on the lever when said float is moved up by a given distance between the lever and the float, and spring means is provided for pushing said lever further and for maintaining it at an open position after the pilot valve disc has been opened by the pushing force of said operating member.

2. An auto-drain unit comprising:

a bowl of cylindrical shape for storing liquid and provided with a drain inlet at an upper portion and a drain outlet at a bottom portion, a drain valve seat for discharging drain and mounted on the drain outlet, a drain valve disc for opening and closing the drain valve seat, a pressure receiving member for opening and closing the drain valve disc by moving up and down as pilot air is supplied to or discharged from a pilot chamber, a pilot valve seat for communicating the pilot chamber with an interior of the bowl, a pilot valve disc for opening and closing the pilot valve seat, an exhaust orifice having an effective opening area smaller than the pilot valve seat and communicating the pilot chamber to atmospheric air, a float moving up and down according to a liquid level of liquid in the bowl, and a lever tilted by upward or downward movement of the float and for opening and closing the pilot valve disc, wherein:

said pressure receiving member, said pilot valve seat, said pilot valve disc, said exhaust orifice and said lever are provided at positions higher than the liquid level of the liquid stored in the bowl;

said bowl is provided with a cover, which can be freely opened, said pressure receiving member, said pilot valve seat, said exhaust orifice and said lever are mounted on said cover, said lever is tiltably supported by said cover at an intermediate point, said float is connected to one side of the intermediate point, and said pilot valve disc is mounted on the other side of the intermediate point;

said cover is provided with a manual operation means, by which it is possible to open the pilot valve disc by manual operation; and an operating member is provided for applying a pushing force on the lever when said float is moved up by a given distance between the lever and the float, and a spring means is provided for pushing up said lever further and for maintaining it at an open position after the pilot valve disc has been opened by the pushing force of said operating member.

3. An auto-drain unit comprising:

a bowl of cylindrical shape for storing liquid and provided with a drain inlet at an upper portion and a drain outlet at a bottom portion, a drain valve seat for discharging drain and mounted on the drain outlet, a drain valve disc for opening and closing the drain valve seat, a pressure receiving member for opening and closing the drain valve disc by moving up and down as pilot air is supplied to or discharged from a pilot chamber, a pilot valve seat for communicating the pilot chamber with an interior of the bowl, a pilot valve disc for opening and closing the pilot valve seat, an exhaust orifice having an effective opening area smaller than the pilot valve seat and communicating the pilot chamber to atmospheric air, a float moving up and down according to a liquid level of liquid in the bowl, and a lever tilted by upward or downward movement of the float and for opening and closing the pilot valve disc, wherein:

said pressure receiving member, said pilot valve seat, said pilot valve disc, said exhaust orifice and said lever are provided at positions higher than the liquid level of the liquid stored in the bowl; and an operating member is provided for applying a pushing force on the lever when the float is moved up by a given distance between said lever and said float, and a spring means is provided for pushing the lever further up and for maintaining it at an open position after said operating member is pushed up and the pilot valve disc is opened.

* * * * *